United States Patent Office 3,143,529
Patented Aug. 4, 1964

---

3,143,529
POLYMERIC DERIVATIVES OF 3-AMINO-2,2-DI-METHYLCYCLOBUTANEACETIC ACID
Glen W. Hedrick, Lake City, Fla., assignor to the United States of America as represented by the Secretary of Agriculture
No Drawing. Filed June 29, 1961, Ser. No. 120,794
6 Claims. (Cl. 260—78)
(Granted under Title 35, U.S. Code (1952), sec. 266)

A non-exclusive, irrevocable, royalty-free license in the invention herein described throughout the world for all purposes of the United states Government, with the power to grant sub-licenses for such purposes, is hereby granted to the Government of the United States of America.

This application is a continuation-in-part of Serial No. 791,512, filed January 27, 1959 now abandoned, which is a division of Serial No. 657,458, filed May 6, 1957, now U.S.P. 3,031,499.

This invention relates to certain polymeric derivates of 3-amino-2,2-dimethylcyclobutaneacetic acid and to the method for producing them. More particularly, it relates to certain homopolymers of 3-amino-2,2-dimethylcyclobutaneacetic acid the 3-acetylamino derivative of the latter and to certain polyamide derivatives of the aminoacid.

The homopolymers are useful in the preparation of protective coating compositions while the copolyamides have good fiber-forming properties and are also useful in the bonding of glass.

In Serial No. 657,458, filed May 6, 1957, it was shown that pinonic acid, or one of its esters, can be reacted with hydrazoic acid in an inert solvent, using sulfuric acid as a catalyst, to yield a mixture of amides. As an illustration, pinonic acid (I) reacts with hydrazoic acid to yield a mixture of 3-acetylamino-2,2-dimethylcyclobutaneacetic acid (II) and the N-methylamide of pinic acid (III) according to the following reaction:

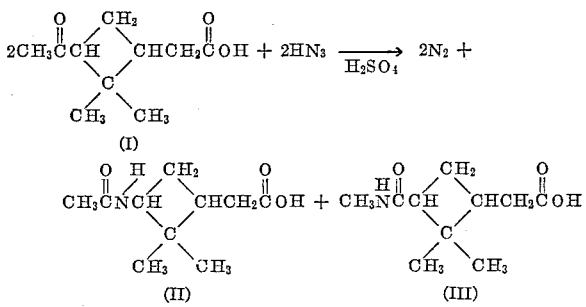

If the corresponding ester of I, such as, for example, the ethyl ester, is used as the starting material, the corresponding ethyl ester of II and III are obtained.

In the above reaction, product II predominates to the extent of about 90%.

Pionic acid (I) is a keto-acid obtained by the permanganate oxidation of α-pinene or by ozonolysis of α-pinene.

Upon hydrodysis with a strong mineral acid, the acetylamino compound (ii) yields 3-amino-2,2-dimethylcyclobutaneacetic acid,

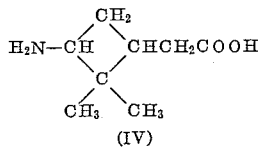

More particularly, the product of the reaction of pinonic acid or its ethyl ester with hydrazoic acid is a mixture of amides, as can be seen from the above equation. Alkaline hydrolysis yields a small amount of methylamine characterized by the p-nitrobenzoyl derivative. Acid hydrolysis results in an appreciable equity of acetic acid characterized by acetanilide. The amounts of these two obtained from the reaction product establishes that 88 to 90% of the acetyl amino compound is present and that 10 to 12% of the N-methylamide of pinic acid is formed simultaneously. These results are confirmed by elemental analyses, molecular refraction and saponification numbers. The presence of pinic acid was confirmed by isolating it from the ether extract after acid hydrolysis. Removal of ether and distilling in vacuo B.P. 185–195° C. C./1 mm., the distillate was proven to be pinic acid by preparing the di(dicyclohexylamine) salt (M.P. 152–154° C., authenic sample 152.6–153.8° C., mixed M.P. 152–154° C.) The main product of the reaction is the cetyl derivative of 3-amino-2,2-dimethlycyclobutaneacetic acid (the ethyl ester if the ester was used). The desired product can be obtained by acid hydrolysis and isolated as the salt or as the free amino acid either from the neutralized mass or by use of an ion exchange resin. The product is an almost colorless solid which was characterized by the neutral equivalent and elemental analyses of its α-naphthyl ureide, M.P. 188–189° C. The hydrochloride of the amino acid is readily prepared, M.P. 167.4–168.2° C.

Compound IV, above as well as its simple esters, are valuable intermediates for the production of polyamide polymers and resins, as well as for the production of surface-active materials having wetting, detergent, emulsifying, and foaming properties, and also for the production of compounds having textile lubricating and softening properties. In the preferred procedure, a hydrazoic acid solution in chloroform is prepared by adding a slight excess of concentrated sulfuric acid to aqueous sodium azide dispersed in the solvent. The solution is decanted from the aqueous salt layer and dried over sodium sulfate. The ketone, either pinonic acid or its ester, is then dissolved in this mixture and slowly added to an agitated mixture of concentrated sulfuric acid in chloroform maintained at 0° to 5° C. During the reaction nitrogen is continuously evolved. When evolution of gas ceases the mass is poured onto ice and water. This can be heated to effect hydrolysis in situ, or it can be neutralized and the product isolated by extraction with chloroform.

If isolation by hydrolysis in situ is desired, the mass is heated to reflux, simultaneously removing the solvent azeotropically. The acetic acid can be removed at this point by distilling and steaming until the distillate is neutral. After a few hours of refluxing, hydrolysis is complete and the mixture is cooled and extracted with chloroform or ether until all the pinic acid is removed. The acid aqueous phase contains the amino acid and methylamine as sulfuric acid salts. These can be neutralized with caustic soda; and either the free amine or the sulfate, depending upon the extent of neutralization, can be obtained by alcohol extraction of the dried mass. To avoid extraction, it is preferred that barium or calcium carbonates or hydroxides be used. By careful neutralization either the sulfate or the free amine can be obtained. It is possible also to obtain the free amine by a partial neutralization with calcium or barium carbonates or hydroxides, filtering to remove the insoluble sulfates, and then passing the filtrate over an ion exchange resin, such as a weakly basic phenol formaldehyde type anion exchanger. The clear effluent is a water solution containing a mixture of methylamine and 3-amino-2,2-dimethylcyclobutaneacetic acid. During evaporation of the water the methylamine distills, leaving behind the amino acid.

Instead of isolation by hydrolysis in situ and subsequent extraction, the product (acetylamino compound), can be isolated by evaporation of the chloroform. The acetylamino compound, when pinonic acid is used, is a viscous liquid monobasic acid which, through acid interchange, yields acetic acid and polymerizes giving a hard resin when heated to above 160° C. for distillation purposes. It may be characterized by converting to the p-bromophenacyl ester or the dicyclohexylamine salt.

The acetyl amino compound obtained from ethyl pinonate is a liquid, B.P. 139°/0.5 mm., $n_D^{20} = 1.4687$, $D^{20} = 1.042$, $M_D = 60.9$, $M_D$ theoretical $= 61,110$. The free amine can be prepared by hydrolysis discussed above.

In addition to the above, the following examples will further illustrate the invention.

EXAMPLE 1

Reaction of Ethyl Pinonate

A chloroform solution of hydrazoic acid was first prepared by adding 35 cc. concentrated sulfuric acid to an agitated mixture of 80 g. sodium azide and 80 cc. water in 515 cc. chloroform held at 0° C. The solution was decanted from the thick, almost solid, aqueous phase containing the excess acid and sodium sulfate and then dried over sodium sulfate. The amount of hydrazoic acid in solution was determined by titration with standard caustic. Ethylpinonate, 175 grams which represented one equivalent weight based on the amount of hydrazoic acid, were then added to this solution.

The solution containing the ethyl pinonate and hydrazoic acid was then added over a 2 to 3 hour period to an agitated mixture of 273 cc. concentrated sulfuric acid and 500 cc. chloroform maintained at 0.5° C. From the start of the addition nitrogen was evolved. After addition of the ester and gas evolution ceased the mixture, light amber in color, was poured onto ice and was isolated in the manner described above. The yield of distilled product from 175 g. ester is 140 g. or 75.5% yield.

EXAMPLE 2

Reaction With Pinonic Acid (a) 162 grams of pinonic acid were dissolved in a chloroform solution of hydrazoic acid and added to sulfuric acid as in Example 1. Isolation of the product by neutralization with sodium hydroxide to a pH of about three, separating the chloroform layer, and evaporating the chloroform resulted in a thick, almost colorless, syrup containing some chloroform and water. The yield was 256 gms. of crude amino acid. Titration of a sample by standard caustic solution and removal of volatiles by evaporation indicated the mix contained 48 to 49% amino acid, or about 70% of the theoretical yield.

The product was characterized by the dicyclohexylamine salt 2(b) below, and the p-bromophenacyl ester, 2(c) below.

(b) *Dicyclohexylamine salt.*— 4 gms. of dicyclohexylamine in about 50 cc. ethyl alcohol were added to 10 gms. of the crude mixture as obtained in 2(a) above. This was warmed and diluted with an equal volume of acetone. A colorless crystalline mass precipitated which was isolated after cooling by filtration. The yield of crude product was almost quantitative, M.P. 192–194° C. and consisted of a mixture of salts of 3-acetylamino-2,2-dimethylcyclobutaneacetic acid and N-methylamide of pinic acid. A small amount of material was obtained by concentration of the filtrate.

Repeated recrystallization of the fractions from a 50% chloroform acetone mixture gave two products. The first and larger fraction melted at 194.4–195.6° C. which, by mixed melting point was identical to the salt prepared from the free amino acid. The smaller fraction after purifying melted at 164.5 to 166° C. and was undoubtedly the salt of N-methylamide of pinic acid.

(c) The hexylamine salt was difficult to purify by crystallization. Consequently, the p-bromophenacyl ester was prepared (Identification of Organic Compounds, Shriner and Fuson, p. 132, second edition). From 2.79 gms. p-bromophenacyl bromide and 5 g. of material prepared in 2(a) above, 2.7 gms. colorless crude ester was obtained, M.P. 162–163.5° C. Recrystallization once from 60% alcohol and once from 95% alcohol yielded a product melting at 166–166.8° C. This was identical to a product obtained by acetylation and esterification of the amino acid.

EXAMPLE 3

Preparation of 3-Amino-2,2-Dimethylcyclobutaneacetic Acid

Either the ester from Example 1 or product from Example 2 may be used for preparation of the amino acid.

(a) *Sulfuric acid hydrolysis.*—Fifty grams pure ester or an equivalent amount of 3-acetylamino-2,2-dimethylcyclobutaneacetic acid were placed in a flask containing about 200 cc. 3 N sulfuric acid and refluxed overnight. This was set up for continuous extraction with ether over a 16 to 24 hour period. After extraction the pinic acid and acetic acid could be isolated from the ether extract. In the case of the ester most of the acetic acid appeared as ethyl acetate. The aqueous phase was exactly neutralized with barium hydroxide or barium carbonate in order to remove all the sulfate ion by filtration from solution. The free amino acid was concentrated to 30 to 50% solids in the filtrate by evaporation of the water. The product crystallized from the concentrate as a colorless solid; presumably an inner salt. Since the acid is quite soluble in water and insoluble in acetone it was found desirable to dilute the concentrated mix with acetone from which the product was isolated.

During the evaporation of the water most of the methyl amine escaped as the free base. However, at no time was the solution completely free of this material. Evaporation of the filtrate to remove the water and acetone resulted in a small amount of material (1.2 gms. from 50 gms. ester) which was believed to be the methylamine salt of a geometric isomer of amino cyclobutaneacetic acid (p-bromophenacyl ester of acetylaminocyclobutaneacetic acid M.P. 113–114° C.).

By neutralizing with sufficient barium salt to neutralize the free sulfuric acid and following the above procedure a white crystalline salt was obtained which was a mixture of the sulfate of the amino acid and methylamine sulfate.

By neutralizing with sodium hydroxide the free amino acid was isolated by drying the neutralized mixture and extracting from the sodium sulfate with absolute alcohol.

(b) *Hydrochloric acid hydrolysis.*—Fifty grams of pure ester or an equivalent amount of 3-acetylamino-2,2-dimethylcyclobutaneacetic acid were placed in a flask with 45 cc. concentrated hydrochloric acid diluted with 150 cc. water. This was refluxed 16 hours then extracted with ether as in 3(a) above. The ether layer was removed and the aqueous phase concentrated in vacuo. Towards the end, colorless, hydroscopic crystals of the hydrochloride of 3-amino-2,2-dimethylcyclobutaneacetic acid appeared. Although the product could be isolated by filtration at this point it was found advantageous to dilute with acetone. The salt is almost completely insoluble in acetone and consequently can be isolated readily and quantitatively, while at the same time excess hydrochloric acid and methylamine hydrochloride are removed. The melting point when dry is 167.6 to 168.6° C. If redissolved in water and reprecipitated by acetone there is no change in melting point.

The hydrochloride obtained from concentration in vacuo above may be converted to the free amino acid by use of an ion exchange resin already referred to. For this, the salt is dissolved in 1 liter distilled water and added dropwise to a previously prepared column 1½ x 30 inches of Amberlite IR–4B resin a basic resin described above. Afterwards, the column is flushed with 2 liters distilled water. The combined clear yellow effluent, and wash, are evaporated to 50 to 100 cc. from which the free amino acid may be isolated as above. The yield is 71%.

EXAMPLE 4

*Preparation of the Hydrochloride From the Free Amino Acid*

The free amino acid (3.14 gms.) was dissolved in 2 cc. concentrated hydrochloric acid by heating on the steam bath. On cooling a heavy mass of colorless crystals appeared. The entire mass was diluted with about 50 cc. acetone, cooled and filtered. The first crop of crystals was dried over concentrated sulfuric acid in a vacuum desiccator (2.07 gms., 53.5% yield, M.P. 167.6 to 168.6° C.). Concentration of the filtrate gave 1.5 gms. of a second crop of colorless crystals, M.P. 165.6–166.8° C. A mixed melting point with first crop gave no depression in melting point. One gram of the first fraction was recrystallized by dissolving in a small amount of water and reprecipitating with acetone, M.P. 167.4–168.2° C.

EXAMPLE 5

*Polymerization of 3-Amino-2,2-Dimethylcyclobutaneacetic Acid*

10 grams of 3-amino-2,2-dimethylcyclobutaneacetic acid was placed in a test tube which was then flushed with nitrogen and sealed. The sealed test tube was placed in a bomb and heated for 7 hours at 250–260° C.

At the end of 7 hours the test tube was removed from the bomb and broken. The resin was separated from the glass, added to 100 cc. of ethanol and heated to reflux. The resin disintegrated with the formation of a thick slurry which was permitted to stand overnight. After standing, the solids were removed by filtration and the filtrate discarded.

About 100 cc. of water was added to the alcohol-insoluble portion, the suspension heated to boiling, then cooled and filtered.

A yield of 3.4 grams of a colorless powder was obtained which had a melting point of 350–360° C. in a sealed capillary. One gram of the powder required 1.3 cc. of N/10 NaOH, indicating a neutral equivalent of 7700.

EXAMPLE 6

One gram of the alcohol insoluble polymer was dissolved in 5 cc. of formic acid, forming a thick solution. The solution was applied to a piece of plywood as a varnish, two coats being applied. When dry, a hard clear coating resulted which could not be dented or scratched with a finger nail.

EXAMPLE 7

*Preparation of Polyamides*

Three separate mixtures of ε-caprolactam, 3-amino-2,2-dimethylcyclobutaneacetic acid, and water were prepared in the following proportions:

|  | 1 | 2 | 3 |
|---|---|---|---|
|  | Grams | Grams | Grams |
| ε-Caprolactam | 10 | 5.0 | 0.5 |
| Amino acid | 0.5 | 5.0 | 5.0 |
| Water | 1.00 | 1.00 | 0.5 |

The mixtures were heated in separate test tubes in an oil bath for 2 hours at 250–260° C. The water boiled off almost at once.

Mixture 1 produced a grayish, hard, opaque mass having a quinoline-like odor. This material was insoluble in water, softened in alcohol, and had good fiber-forming properties.

Mixture 2 formed a clear, amber, hard mass which was brittle. This material had very good bonding power to glass.

Mixture 3 formed a clear, hard, brittle mass which was darker than the products of either (1) or (2). This material also had good bonding power to glass.

EXAMPLE 8

5.93 grams of terephthalic acid, 5.75 grams of 72% hexamethylenediamine, and 5.55 grams of 3-amino-2,2-dimethylcyclobutaneacetic acid was heated at 300° C. for 3 hours. A clear melt formed which cooled to a clear, hard, brittle resinous polyamide and had a melting point of 270–350° C. This product could be drawn when warm and had good fiber-forming properties.

EXAMPLE 9

To show that the amino acid was necessary for resin formation in Example 8, the experiment was repeated with the same amounts of terephthalic acid and hexamethylenediamine, but omitting the amino acid.

The mixture of terephthalic acid and hexamethylenediamine was heated for 3 hours at 360° C. to keep it molten. When cooled, the reaction mixture formed a solid having a melting point of 345–360° C. However, the polymer was nonresinous, it could easily be broken into a powder, and could not be drawn into a fiber from the molten state. It crumbled immediately after cooling.

In the foregoing examples, the free amino acid was used in the preparation of the resinous polymers. However, it will be obvious to those skilled in the art that the 3-acetylamino derivative can be substituted for the 3-amino-2,2-dimethylcyclobutaneacetic acid in the processes of this invention.

I claim:

1. The process which comprises heating a compound selected from the group consisting of 3-amino-2,2-dimethylcylclobutaneacetic acid and 3-acetylamino-2,2-dimethylcyclobutaneacetic acid until a resinous homopolymer of 3-amino-2,2-dimethylcyclobutaneacetic acid is produced.

2. The process which comprises heating a mixture of ε-caprolactam and 3-amino-2,2-dimethylcyclobutaneacetic acid to produce a resinous polyamide.

3. The process which comprises heating a mixture of terephthalic acid, hexamethylenediamine, and 3-amino-2,2-dimethylcyclobutaneacetic acid until a resinous polyamide is produced.

4. A resinous homopolymer of 3-amino-2,2-dimethylcyclobutaneacetic acid.

5. A fiber-forming polycarbonamide of ε-caprolactam and 3-amino-2,2-dimethylcyclobutaneacetic acid.

6. A fiber-forming polycarbonamide of terephthalic acid, hexamethylenediamine, and 3-amino-2,2-dimethylcyclobutaneacetic acid.

References Cited in the file of this patent

UNITED STATES PATENTS

| | | |
|---|---|---|
| 2,174,527 | Peterson | Oct. 3, 1939 |
| 3,074,914 | Armen | Jan. 22, 1963 |